(12) United States Patent
Inoue

(10) Patent No.: US 7,180,700 B2
(45) Date of Patent: Feb. 20, 2007

(54) CASSETTE LIBRARY DEVICE

(75) Inventor: Yukihiro Inoue, Toon (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/546,631

(22) PCT Filed: Feb. 28, 2005

(86) PCT No.: PCT/JP2005/003305

§ 371 (c)(1),
(2), (4) Date: Aug. 24, 2005

(87) PCT Pub. No.: WO2005/083698

PCT Pub. Date: Sep. 9, 2005

(65) Prior Publication Data

US 2006/0158774 A1    Jul. 20, 2006

(30) Foreign Application Priority Data

Mar. 1, 2004    (JP)    ............................ 2004-055602

(51) Int. Cl.
*G11B 15/68* (2006.01)
(52) U.S. Cl. ...................................................... 360/92
(58) Field of Classification Search .................. 360/92
See application file for complete search history.

(56) References Cited

U.S. PATENT DOCUMENTS

| 4,945,430 A | * | 7/1990 | Konishi et al. ............... 360/92 |
| 5,285,335 A | * | 2/1994 | Sato ............................. 360/92 |
| 5,455,725 A | * | 10/1995 | Lee ............................... 360/92 |
| 6,038,099 A | * | 3/2000 | Heinze et al. ................ 360/92 |
| 6,266,316 B1 | | 7/2001 | Luffel et al. |
| 2004/0114271 A1 | * | 6/2004 | Taki et al. .................... 360/92 |

FOREIGN PATENT DOCUMENTS

JP    2000-251373    9/2000

OTHER PUBLICATIONS

"DDS-built-in Backup Library", New Technology of Matsushita Electric Technology Industrial Co., Ltd. 2002, May 2003, pp. 155-156 (w/translation of relevant paragraphs).

* cited by examiner

*Primary Examiner*—Hoa T. Nguyen
*Assistant Examiner*—Mark Blouin
(74) *Attorney, Agent, or Firm*—Steptoe & Johnson LLP

(57) ABSTRACT

A cassette library apparatus includes a swing arm (16a) provided at a swing frame (34) provided at a picker (15) to be swingable up and down, and swingable integrally with the swing frame (34), an engaging part (18) provided at a tip end of the swing arm (16a) and linked to an upward swing motion of the swing arm (16a) to be able to get into a recessed part (10a) of the cassette (1) from below, and a nut-shaped body (48) which is mounted to the swing frame (34) and screwed onto a feed screw (47) provided at the picker in an up-and-down direction, and swings the swing frame (34) by the operation of the feed screw (47).

5 Claims, 13 Drawing Sheets

CASSETTE LIBRARY DEVICE

The present application is based on International Application PCT/JP2005/003305, filed Feb. 28, 2005, which application is incorporated herein by reference in its entirety.

TECHNICAL FIELD

The present invention relates to a cassette library apparatus, and particularly relates to a cassette library apparatus which draws out a cassette such as a tape cassette housed in a garage by a picker of a turn table structure, and transfers the cassette to a driver for performing recording and reproduction on a medium in the cassette.

BACKGROUND ART

As shown in FIG. 11, as a cassette library apparatus of this kind, the one in which a plurality of garages 4 are disposed in an annular form on a turn table 2 and a tape cassette 1 is housed in each of the garages 4 is known. In this apparatus, the turn table 2 is rotated by a drive mechanism 3, and thereby, the garage 4 housing the targeted cassette 1 is opposed to an elevator mechanism 5. This elevator mechanism 5 takes the targeted tape cassette 1 out of the garage 4 and loads and unloads the targeted tape cassette 1 into and out of a tape drive 6, whereby readout and write of information are carried out ("New Technology of Matushita Electric 2002" 2003/05, pages 155 to 159 "DDS loaded backup library" issued by R&D Planning Office, Matsushita Electric Industrial Co., Ltd.).

In this construction, loading and unloading the tape cassettes into and out of the tape drive 6 can be automated within the range of the data library housed in the turn table 2. However, when a number of tape cassettes 1 which are housed in the limited space as the tape library are needed, a magazine type shown in FIG. 12 is said to be more suitable than a turn table type like this.

In this magazine type cassette library apparatus, the tape drive 6 and a set of magazine type garages 8a and 8b are disposed inside a casing 7 as shown in FIG. 12. A plurality of tape cassettes 1 are housed in each of the garages 8a and 8b in the state in which they are aligned in a row. A picker 9 disposed between the set of garages 8a and 8b transfers the tape cassette 1 from and to these garages 8a and 8b and the tape drive 6.

FIG. 13 shows a construction of one example of the tape cassette 1. This tape cassette 1 is formed in a thin rectangular parallelepiped shape as shown in the drawing, and recessed parts 10a and 10b are respectively formed at both side portions of its bottom side. Reference numeral 11 denotes a bottom surface of the tape cassette 1, and reference numerals 12a and 12b denote its side surfaces. As shown in FIGS. 12 to 14, the tape cassette 1 is housed in the garages 8a and 8b so that its recessed parts 11a and 10b are located at open sides of the garages 8a and 8b, namely, the sides near to the picker 9. Each of the recessed parts 10a and 10b has a side wall surface 13 which is formed at a position near to the open sides of the garages 8a and 8b, namely, the position near to the picker 9, and a bottom surface 14.

As shown in FIGS. 12 and 15, the picker 9 includes a movable body 15 movable in the horizontal direction. The movable body 15 has a set of swing arms 16a and 16b as shown in FIGS. 12 to 15, and the swing arms 16a and 16b are swingable in an up-and-down direction. Each of the swing arms 16a and 16b has a main body 17 in the horizontal direction and a raised part 18 as an engaging portion raised upward from a tip end of the main body 17.

When the swing arms 16a and 16b swing upward in the state in which the movable body 15 of the picker 9 is close to the tape cassette 1 housed in the garages 8a and 8b as shown in FIG. 15, the main body 17 contacts the bottom surface 11 of the tape cassette 1, and the tip end raised parts 18 get into the recessed parts 10a and 10b, as shown in the drawing. At this time, the raised parts 18 of a set of the swing arms 16a and 16b locates the bottom surfaces 14 of the recessed parts 10a and 10b. As a result, the tape cassette 1 is chucked by the swing arms 16a and 16b. In this state, the movable body 15 moves in the direction to be away from the garages 8a and 8b, whereby the raised parts 18 of the swing arms 16a and 16b abut on the side wall surfaces 13 of the recessed parts 10a and 10b, and the tape cassette 1 can be drawn out of the garages 8a and 8b.

As shown in FIGS. 12 and 15, the picker 9 has a guide rail 19, and the tape cassette 1 which is drawn out is placed on this guide rail 19. Thereby, transfer of the tape cassette 1 from the garages 8a and 8b to the picker 9 is completed.

A swing mechanism of the swing arms 16a and 16b is constructed as shown in FIG. 16 or FIG. 17.

FIG. 16 shows one example of the swing mechanism. The swing arms 16a and 16b turn around a support point 20 and swing in the up-and-down direction. This swing motion is performed by a drive motor via a gear mechanism 21.

FIG. 17 shows another example of the swing mechanism. Swing of the swing arms 16a and 16b around the support point 20 is performed by a link mechanism 22 which is driven by a motor not shown.

DISCLOSURE OF THE INVENTION

However, in the apparatuses using the gear mechanism 21 and the link mechanism 22 as the swing mechanisms for the swing arms 16a, 16b as shown in FIGS. 16 and 17, the mechanisms are complicated, and hence, there arises the problem of increase in the number of components and the number of assembling steps.

Therefore, it is an object of the present invention to solve the above problem and to make it possible to simply construct a drive mechanism of swing arms for cassette chuck in a picker of a cassette library apparatus.

In order to achieve the above object, a cassette library apparatus including a picker for drawing a cassette housed in a garage and having a recessed part at a bottom portion from the garage and pushing the cassette into the garage, includes a swing frame provided at the picker to be swingable up and down; a swing arm provided at the swing frame and swingable integrally with the swing frame; an engaging part provided at a tip end of the swing arm and linked to an upward swing motion of the swing arm to be able to get into the recessed part of the cassette from below; a feed screw provided at the picker in an up-and-down direction; and a nut-shaped body which is screwed onto the feed screw, mounted to the swing frame and swings the swing frame by the operation of the feed screw.

With such a construction, the drive mechanism of the swing arm can have the simple construction only provided with the feed screw and the nut-shaped body which is mounted to the swing frame and swings the swing frame by the operation of the feed screw.

In the apparatus of the present invention, the nut-shaped body is preferably mounted to the swing frame with a play with respect to the swing frame.

With such a construction, the swing frame and the nut-shaped body are relatively slantly displaceable, and hence, the swing frame which performs a swing motion, namely, a curvilinear motion which is not a linear motion can be swung without hindrance by the screw feed mechanism which is a linear feed mechanism.

According to the present invention, the nut-shaped body is preferably mounted to the swing frame with plays in a swing direction of the swing frame and in a direction of a plane perpendicular to the swing direction of the swing frame.

With the above construction, the swing frame can be swung without hindrance by this feed screw even if the feed screw and the swing frame are not positioned with high accuracy, or even if the placement of the feed screw is not accurate.

According to the present invention, the swing frame is preferably formed into a plate-shaped body; a first through-hole and a second through-hole in a long hole shape are formed in the swing frame; and the nut-shaped body has a first projection which is inserted into the first through-hole in a state in which the first projection has a play, and a second projection which is inserted into the second through-hole with a play in a lengthwise direction of the long hole shape.

With such a construction, a concrete mechanism in which a predetermined play is provided between the nut-shaped body and the swing frame, and a rotation of the nut-shaped body is stopped, can be built.

According to the present invention, a rotation stopper for the nut-shaped body is preferably applied.

According to such a construction, even when the play exists between the nut-shaped body and the swing frame, the screw feed mechanism can be constructed without hindrance because the rotation stopper is applied to the nut-shaped body.

According to the present invention, a cassette library apparatus including a picker for drawing a cassette housed in a garage and having a recessed part at a bottom portion from the garage and pushing the cassette into the garage, comprises a swing frame provided at the picker to be swingable up and down, a swing arm provided at the swing frame and swingable integrally with the swing frame, an engaging part provided at a tip end of the swing arm and linked to an upward swing motion of the swing arm to be able to get into the recessed part of the cassette from below, a feed screw provided at the picker in an up-and-down direction, and a nut-shaped body which is screwed onto the feed screw, mounted to the swing frame and swings the swing frame by the operation of the feed screw, and hence, the drive mechanism of the swing arm can have the simple construction only provided with the feed screw and the nut-shaped body which is mounted to the swing frame and swings the swing frame by the operation of the feed screw.

BEST MODE FOR CARRYING OUT THE INVENTION

Figure 5:
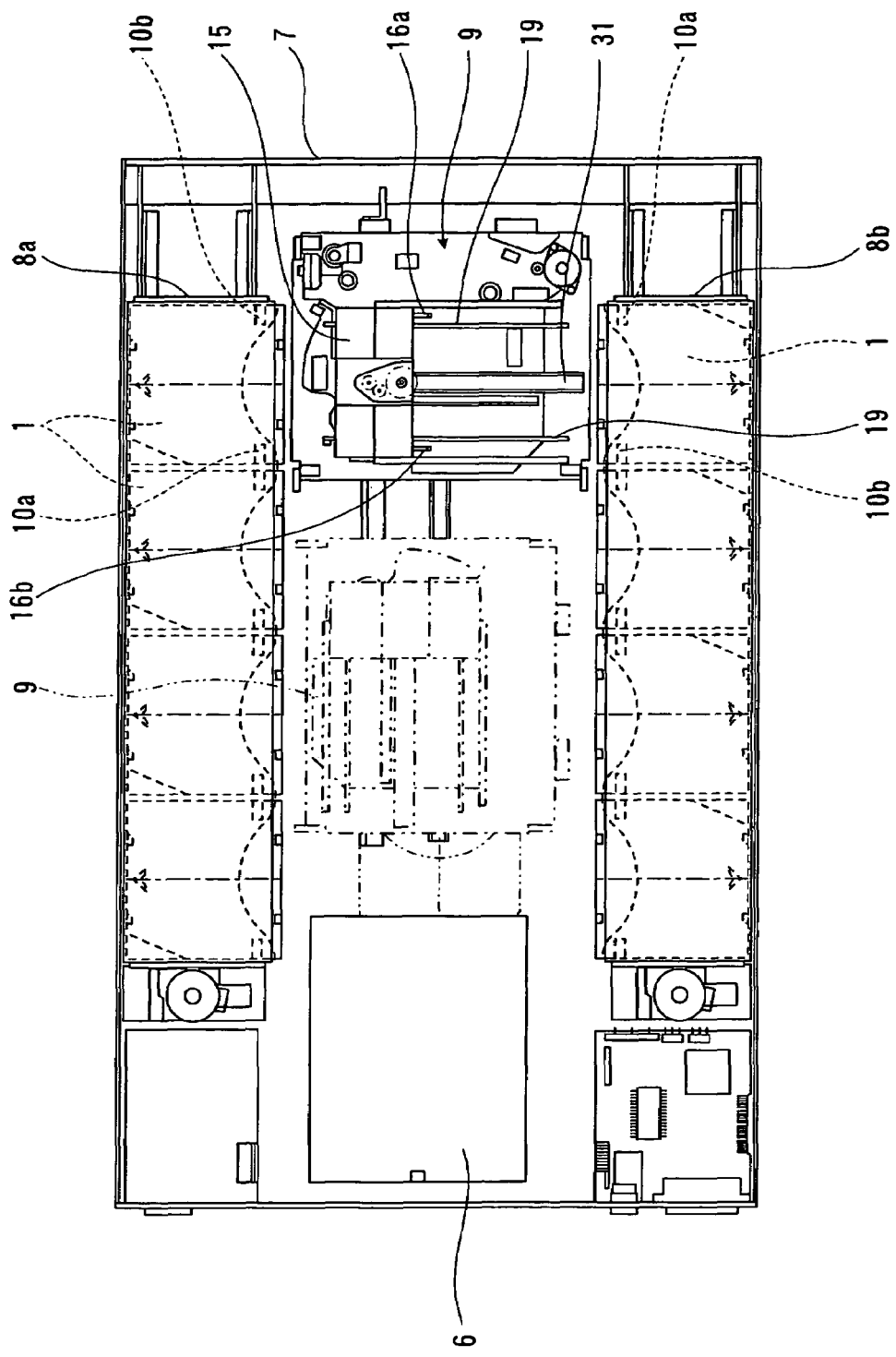
FIG. 5 is a plane view of the entire cassette library apparatus.
Figure 6:
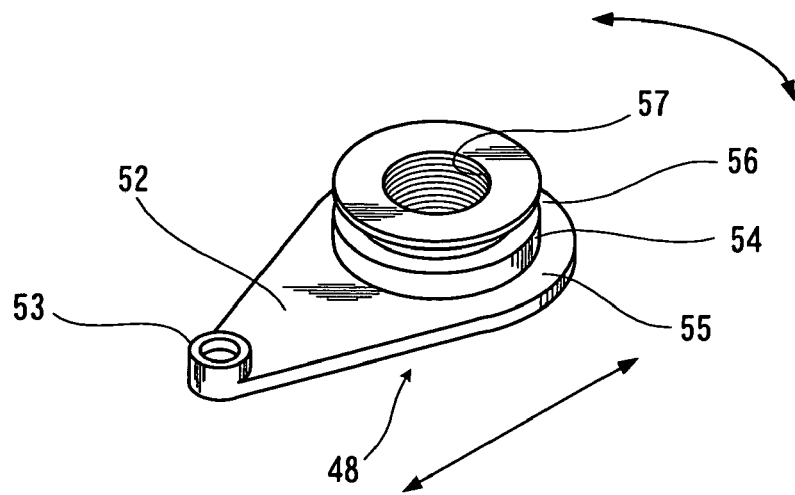
FIG. 6 is a perspective view of a nut-shaped body in the cassette library apparatus in FIGS. 1 to 5.
Figure 12:
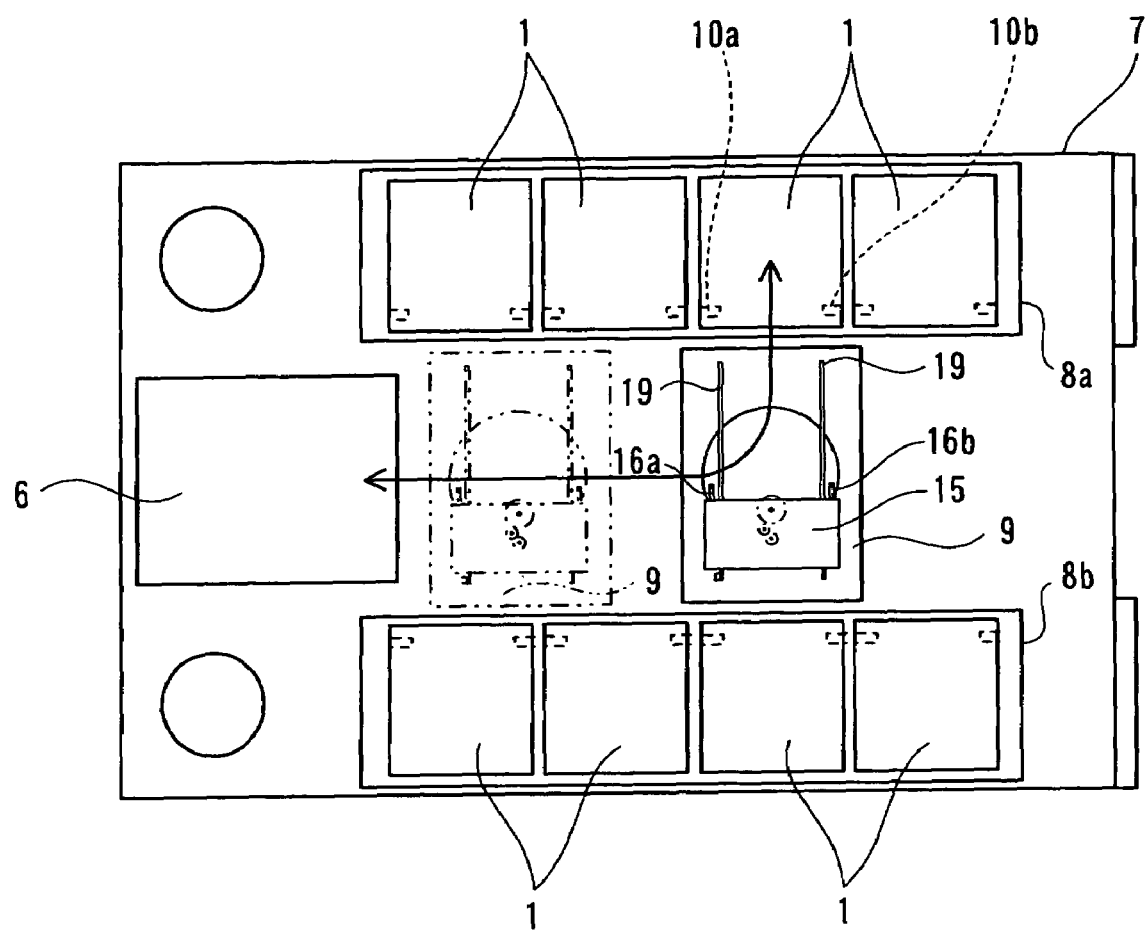
FIG. 12 is a schematic view of another known cassette library apparatus.
Figure 13:
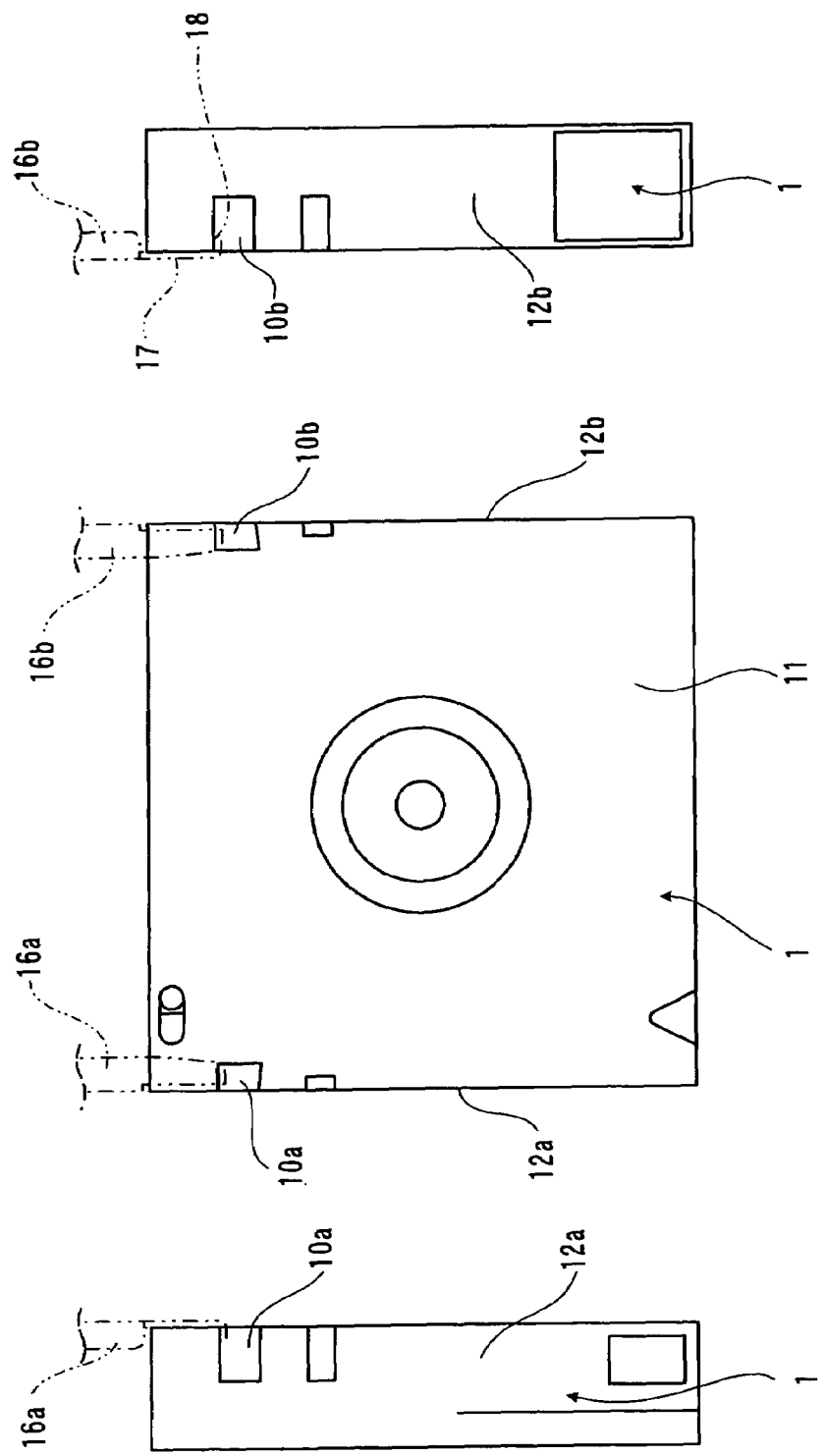
FIG. 13 is a schematic view of a tape cassette in the apparatus in FIG. 12.
Figure 14:
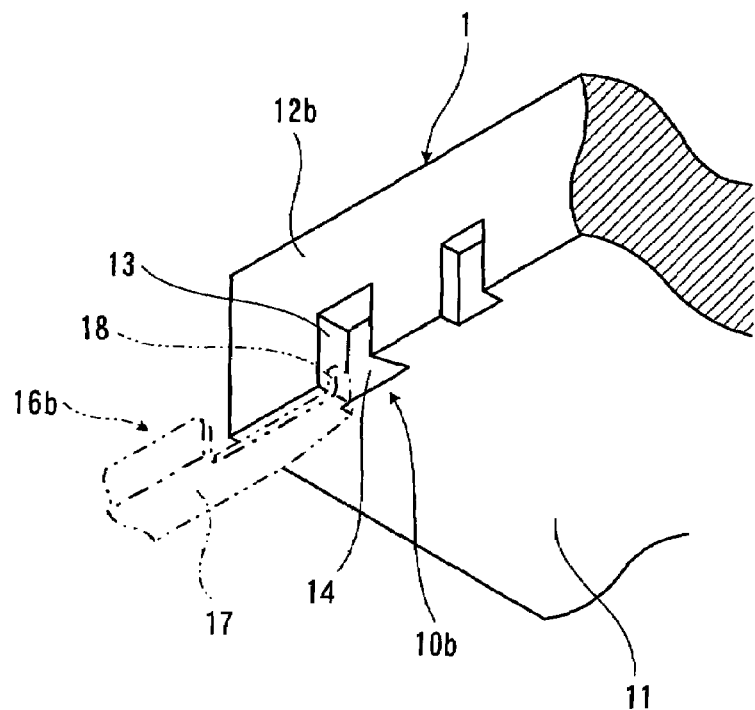
FIG. 14 is a perspective view of an essential part of the tape cassette in FIG. 13.
Figure 15:
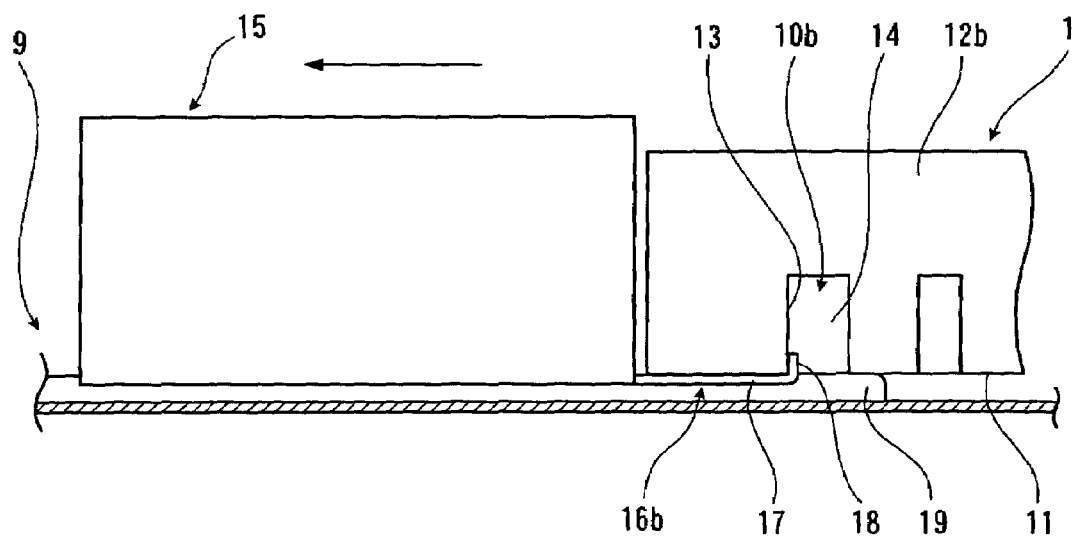
FIG. 15 is a view showing a state in which the tape cassette in FIGS. 13 and 14 is drawn by a picker.
Figure 16:
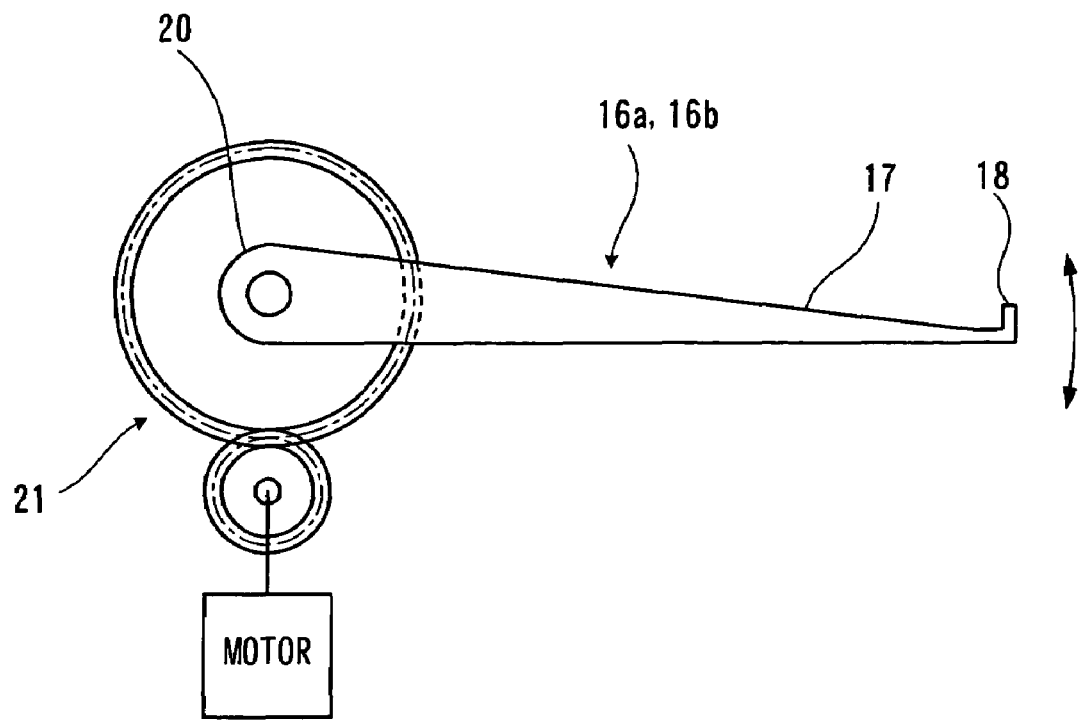
FIG. 16 is a view showing one example of a drive mechanism of a swing arm in the picker in FIG. 15.
Figure 17:
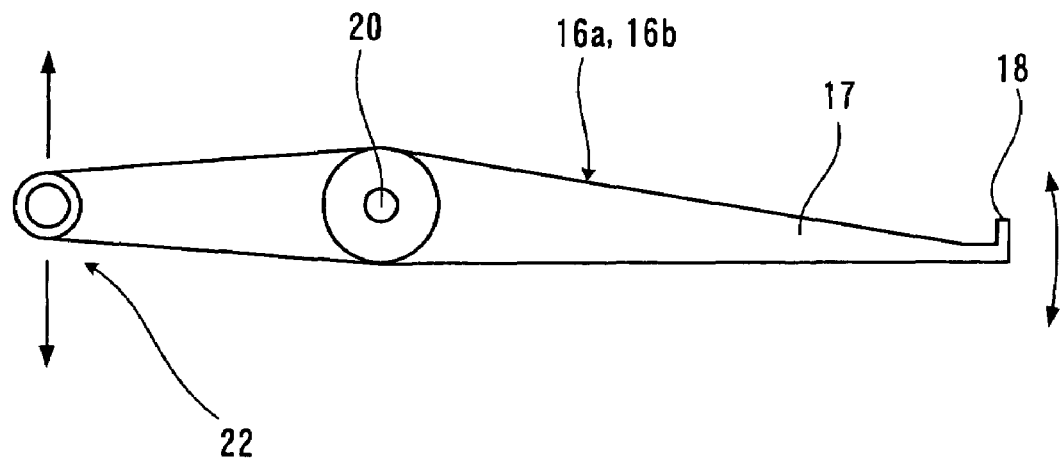
FIG. 17 is a view showing another example of the drive mechanism of the swing arm in the picker in FIG. 15.

FIG. 5 shows a plane view of an embodiment of a cassette library apparatus of the present invention. This apparatus is of the same magazine type as the known cassette library apparatus shown in FIG. 12, and includes a casing 7, garages 8a and 8b, a picker 9 and a tape drive 6. The tape cassettes 1 are housed in the garages 8a and 8b each in a posture in which recessed parts 10a and 10b are located at the open sides of the garages 8a and 8b, namely, the positions near the picker 9.

The picker 9 has a movable body 15 capable of moving in the horizontal direction and coming closer to and going away from the garages 8a and 8b and the tape drive 6, a guide rail 31 for guiding the movement of the movable body 15, and another guide rail 19 which is provided at a higher position than the guide rail 31 and thereby guides the tape cassette 1 that is drawn out onto the picker 9 and placed on the guide rail 19. The guide rail 31, the guide rail 19 and the movable body 15 are constructed to be rotatable in the horizontal direction inside the picker 9, and thereby the posture, namely the orientation in the horizontal direction of the tape cassette 1 can be changed.

FIGS. 1 to 4 show a detailed structure of the movable body 15. This movable body 15 has a plate-shaped lower side stationary frame 32, a plate-shaped upper side stationary frame 33, and a plate-shaped swing frame 34 provided between these stationary frames 32 and 33. For details, a frame-shaped structure 36 is constructed by fixing and integrating the stationary frames 32 and 33 by a fastening element 35 to each other, and the structure 36 forms a framework of the movable body 15. Bearings 38 having U-shaped grooves 37 facing upward are respectively formed at both end portions of the lower side stationary frame 32 along the direction perpendicular to a moving direction of the movable body 15. Bearings 40 having U-shaped grooves 39 facing downward are respectively formed at both end portions of the upper side stationary frame 33 along the direction perpendicular to the moving direction of the movable body 15. The swing frame 34 has shafts 41 in the horizontal direction at both end portions respectively, and the shafts 41 are supported by the bearings 38 and 40, whereby the swing frame 34 is made swingable around the horizontal axis in the direction perpendicular to the moving direction of the movable body 15. Both end portions of the swing frame 34 along the moving direction of the movable body 15 are formed to be bent downward respectively, and thereby, forms stoppers 42 capable of abutting against the lower stationary frame 32. The swing range of the swing frame 34 is restricted by the stoppers 42.

A set of swing arms 16a and 16b are integrally formed at both end portions of the swing frame 34 along the perpendicular direction to the moving direction of the movable body 15. The swing arms 16a and 16b have main bodies 17 which project horizontally in the moving direction of the movable body 15 from the structure 36, and raised parts 18 as engaging parts which are integrally formed at tip ends of the main bodies 17.

A set of swing arms 16a and 16b are basically formed at one side along the moving direction of the movable body 15 of the movable body 15 as shown by the solid line in the drawing. However, as shown by the solid line and the phantom line in FIG. 2, sets of swing arms 16a and 16b can be respectively formed at both sides along the moving direction of this movable body 15.

A swing mechanism of the swing frame 34 will be explained. Inside the structure 36, a stepping motor 45 is mounted to the upper side stationary frame 33, and a gear mechanism 46 linked to a drive shaft of this motor 45 is provided at a position on the upper surface of the upper side stationary frame 33. A screw shaft 47 in the up-and-down direction as a feed screw is provided inside the structure 36 and is rotationally driven by the motor 45 via the gear mechanism 46. The screw shaft 47 is supported by a bearing 49 which is disposed inside the structure 36 and mounted to the upper stationary frame 33 in an upper portion of the screw shaft 47. A nut-shaped body 48 is mounted to the swing frame 34 in the loose state having a play. The screw shaft 47 and the nut-shaped body 48 are screwed onto each other.

Due to such a construction of the swing mechanism, the screw shaft 47 is rotated by the motor 45 via the gear mechanism 46, whereby, the nut-shaped body 48 screwed onto the screw shaft 47 rises and lower, and thereby, the swing frame 34 is swung within the range restricted by the stopper 42. With the swing of the swing frame 34, the swing arms 16a and 16b are similarly swung.

The detail of the spot where the nut-shaped body 48 is mounted loosely to the swing frame 34 in the state having a play will be explained based on FIGS. 6 to 10.

Figure 7:
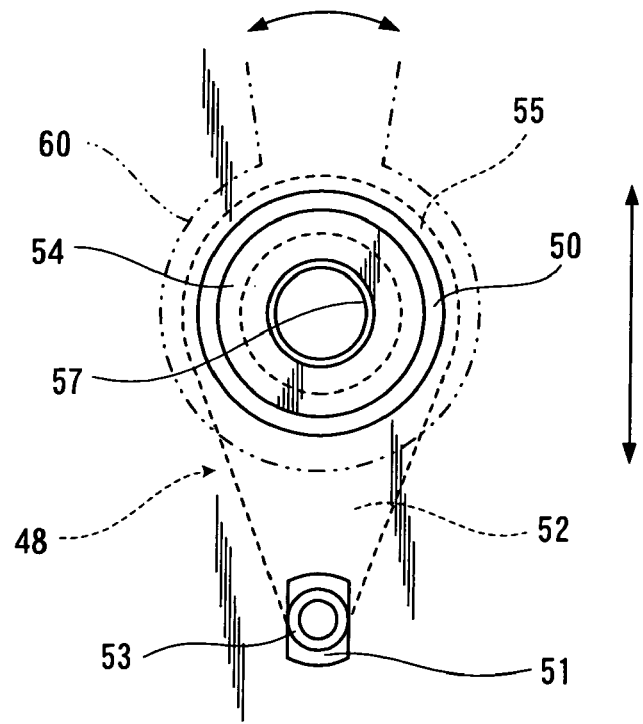
FIG. 7 is a plane view showing a mounting state of the nut-shaped body in FIG. 6.
Figure 8:
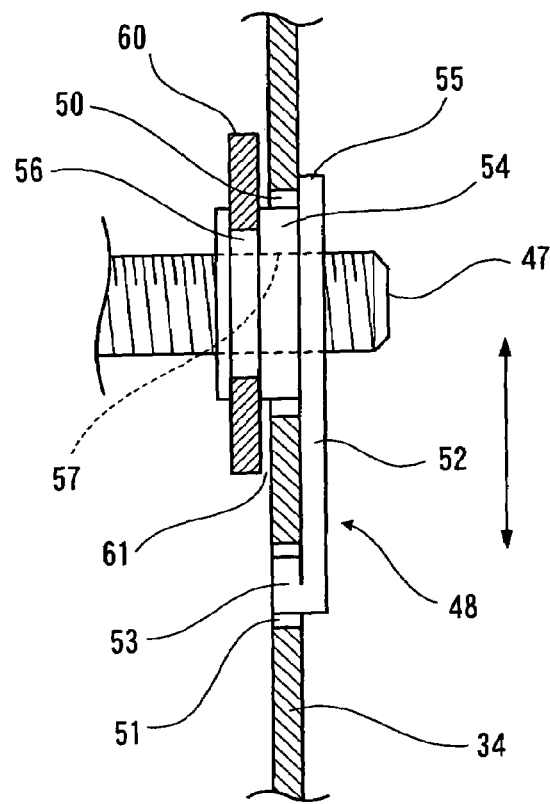
FIG. 8 is a sectional view showing the mounting state of the nut-shaped body in FIG. 6.
Figure 9:
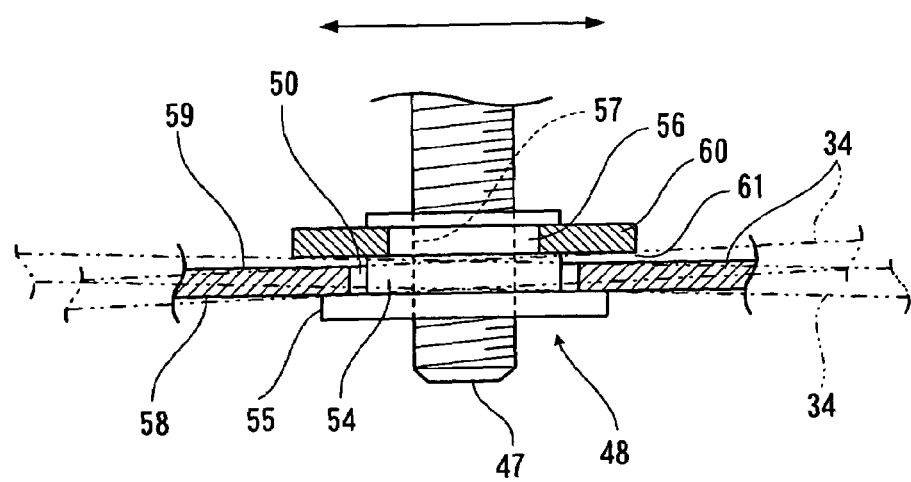
FIG. 9 is another sectional view showing the mounting state of the nut-shaped body in FIG. 6.

As shown in FIGS. 7 to 9, in the swing frame 34, a circular first through-hole 50 and an oval second through-hole 51 in a long hole shape are formed at a predetermined distance from each other in the direction perpendicular to the moving direction of the movable body 15. The oval second insertion hole part 51 is formed to be a long hole in the perpendicular direction to the moving direction of the movable body 15.

As shown in FIGS. 6 to 9, the nut-shaped body 48 has a drop-shaped plate 52, a small columnar projection 53 which is integrally formed at a projected end portion of the plate part 52 to project from the drop-shaped plate 52, and a large columnar projection 54 which is integrally formed to project from the plate 52 at a round portion of the drop-shaped plate part 52. The plate 52 is formed to be larger than a diameter of the large projection 54 in a periphery of the large projection 54, thereby constructing a flange 55. The flange 55 is formed to be in a larger size than the first through-hole 50. An annular groove 56 with a rectangular cross section is formed at an outer periphery of the large projection 54 in a portion at a distance in the projecting direction from the flange 55. An inner thread 57 is formed at a center of the large projection 54 through the large projection 54 and the plate 52.

The small projection 53 is capable of being fitted into the second through-hole 51 in the oval shape. The small projection 53 is formed to have a slightly smaller diameter than the narrower width of the second through-hole 51, and thereby, the small projection part 54 does not practically move in the direction of the smaller width in the second through-hole 51, namely, in the moving direction of the movable body 15, and can freely move in a predetermined range in the larger width direction of the oval second through-hole part 51, namely, in the perpendicular direction to the moving direction of the movable body 15.

The large projection 54 of the nut-shaped body 48 is formed to have a smaller diameter than the circular first through-hole 50 by a predetermined dimension, and is capable of being fitted into the first through-hole 50. Therefore, the large projection 54 is capable of moving freely within a predetermined range in the perpendicular direction to the moving direction of the movable body 15 in correspondence with the small projection 53 being movable along the second through-hole 51 as described above. The large projection 54 is formed to have a smaller diameter than the first through-hole 50, and thereby, the large projection 54 is movable within the predetermined range in the moving direction of the movable body 15. In other words, the large projection 54 is made movable, having a play in the direction of the plane perpendicular to the swing direction of the swing fame 34. Since the small projection 53 is restrained from the movement in the moving direction of the movable body 15 by the second through-hole 51 as described above, the large projection 54, namely, the nut-shaped body 48 is movable along the arc-shaped route with the small projection 53 as a center with respect to the moving direction of the movable body 15.

Since the large projection 54 is fitted into the first through-hole 50, and the small projection 53 formed at the position at a distance from this large projection 54 is fitted into the second through-hole 51, a rotation stopper is applied to the nut-shaped body 48 when the nut-shaped body 48 and the screw shaft 47 are screwed onto each other.

In the nut-shaped body 48, the small projection 53 is fitted into the second through-hole 51, and the large projection 54 is fitted into the first through-hole 50. When the plate 52, namely, the flange 55 contacts a lower surface 58 of the swing frame 34 as shown in FIG. 9, the annular groove 56 is located at a distance from an upper surface 59 of the swing frame 34 as shown in the drawing. In this state, a retaining ring 60 is fitted into the annular groove 56. The retaining ring 60 is formed to have a larger size than the first through-hole 51 as the flange 55, and thereby, the peripheral edge of the first through-hole 50 in the swing frame 34 is held between the flange 55 and the retaining ring 60, whereby prevention against the removal of the nut-shaped 48 from the swing frame 34 is performed.

As described above, when the plate 52, namely, the flange 55 contacts the lower surface 58 of the swing frame 34, the annular groove 56, namely, the retaining ring 60 is located at a distance from the upper surface 59 of the swing frame 34, and therefore, a predetermined clearance 61 is formed between the flange 55 and the retaining ring 60, and the swing frame 34 as shown in FIGS. 8 and 9. Due to the existence of the clearance 61, the nut-shaped body 48 has a play in the swing direction of the swing frame 34.

Figure 10:
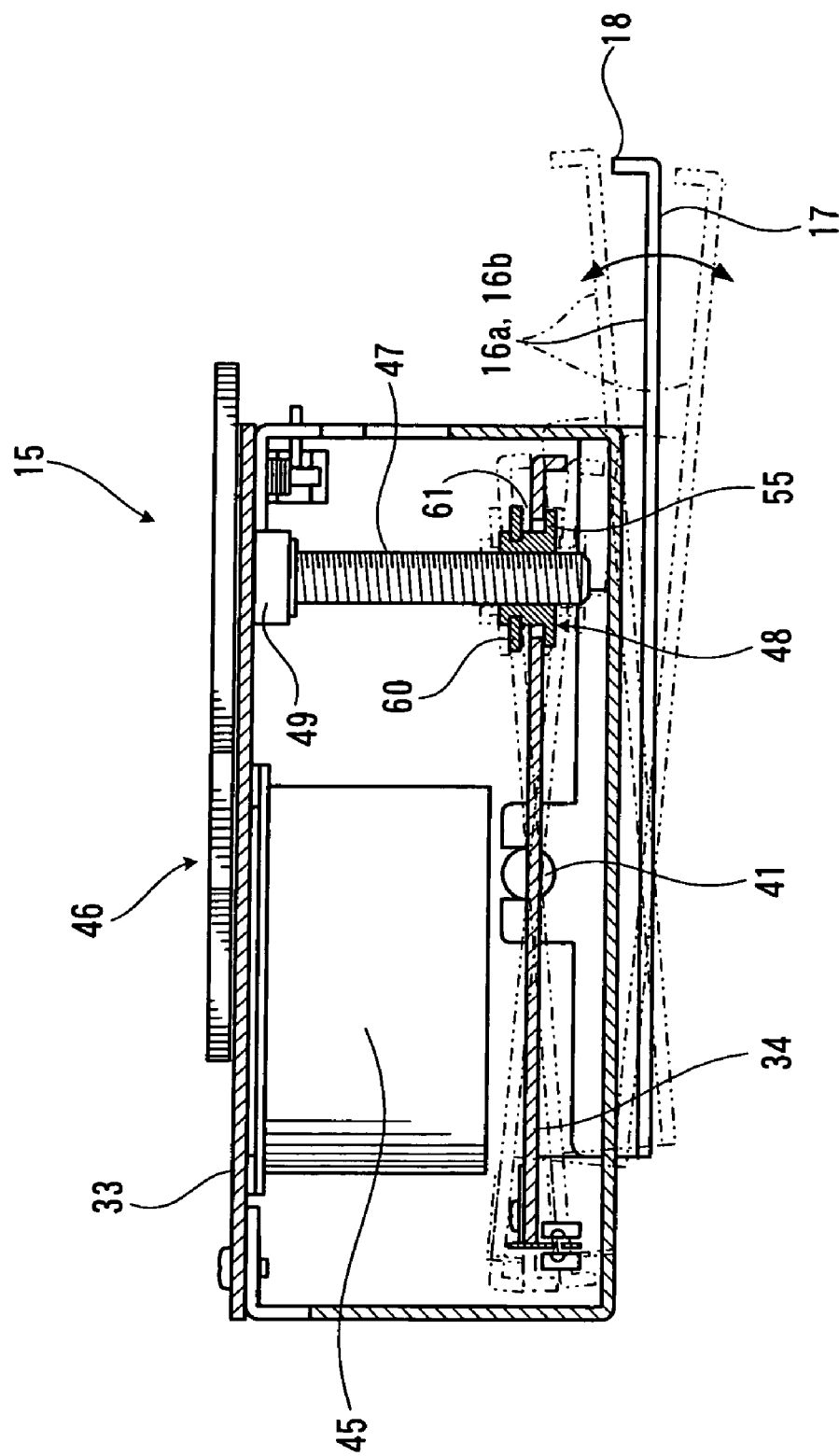
FIG. 10 is a sectional view showing a structure of a mounting part of the nut-shaped body.
Figure 11:
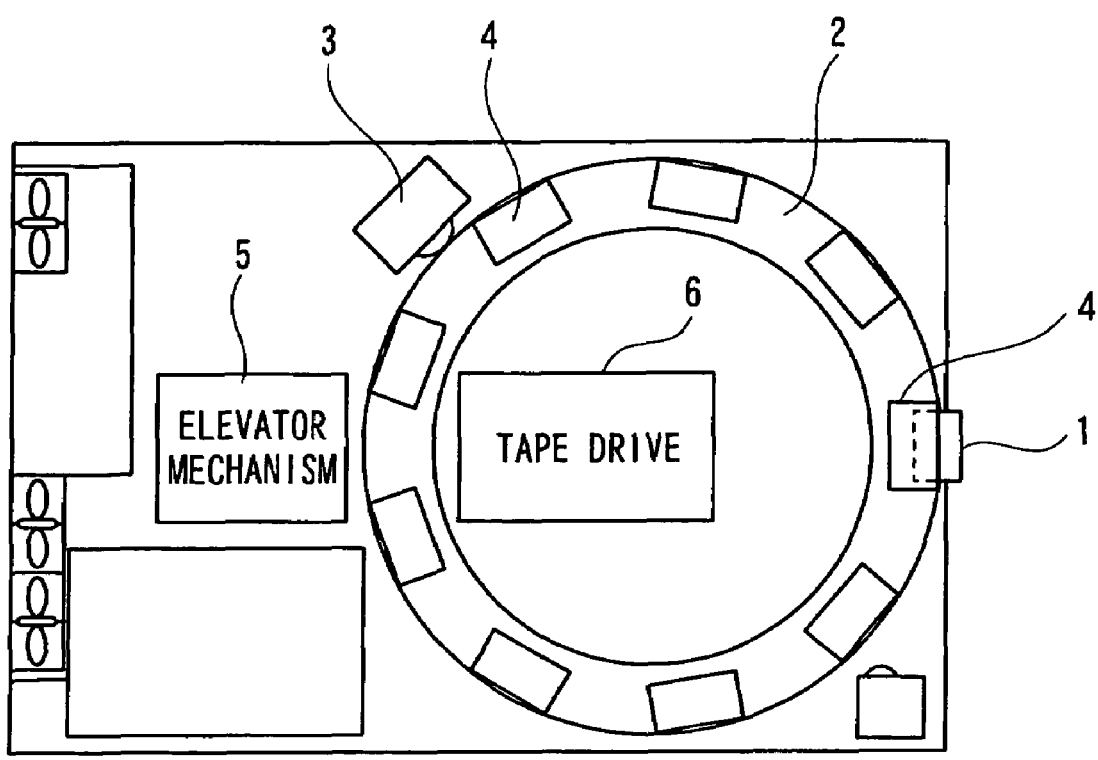
FIG. 11 is a schematic view of a known cassette library apparatus.

Since the play in the swing direction of the swing frame 34 and the play in the direction of the plane perpendicular to the swing direction are formed between the nut-shaped body 48 and the swing frame 34, the nut-shaped body 48 and the screw shaft 47, and the swing frame 34 are relatively displaceable slantly as shown in FIG. 9. As a result, as shown in FIG. 10, when the nut-shaped body 48 is raised and lowered by the rotation of the screw shaft 47, the swing frame 34 is capable of swinging naturally.

Since the play is provided between the nut-shaped body 48 and the swing frame 34, the nut-shaped body 48 can follow the position and posture of the screw shaft 47, and hence, the advantage that high accuracy is not required for positioning of the screw shaft 47 and the swing frame 34 is provided. For example, the screw shaft 47 is supported one-sidedly at only the upper end by the bearing 49 as described above, but with such a construction, the swing frame 34 can be swung without any hindrance. Alternatively, for example, when the screw shaft 47 is not disposed in the accurate vertical direction, and some deviation or the like occurs, the swing frame 34 can be swung favorably without any problem.

Figure 1:
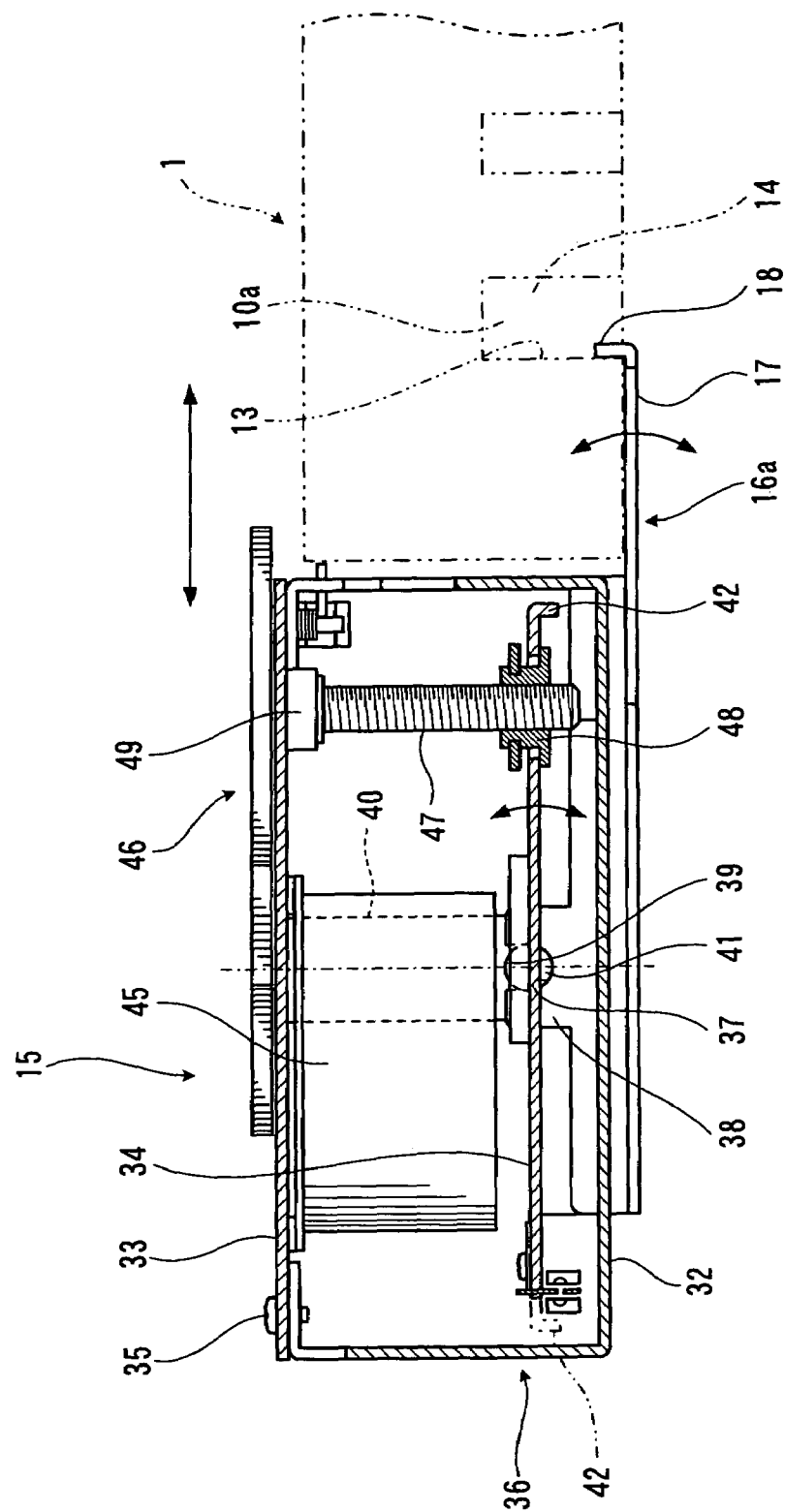
FIG. 1 is a sectional view of an essential part of an embodiment of a cassette library apparatus of the present invention.
Figure 2:
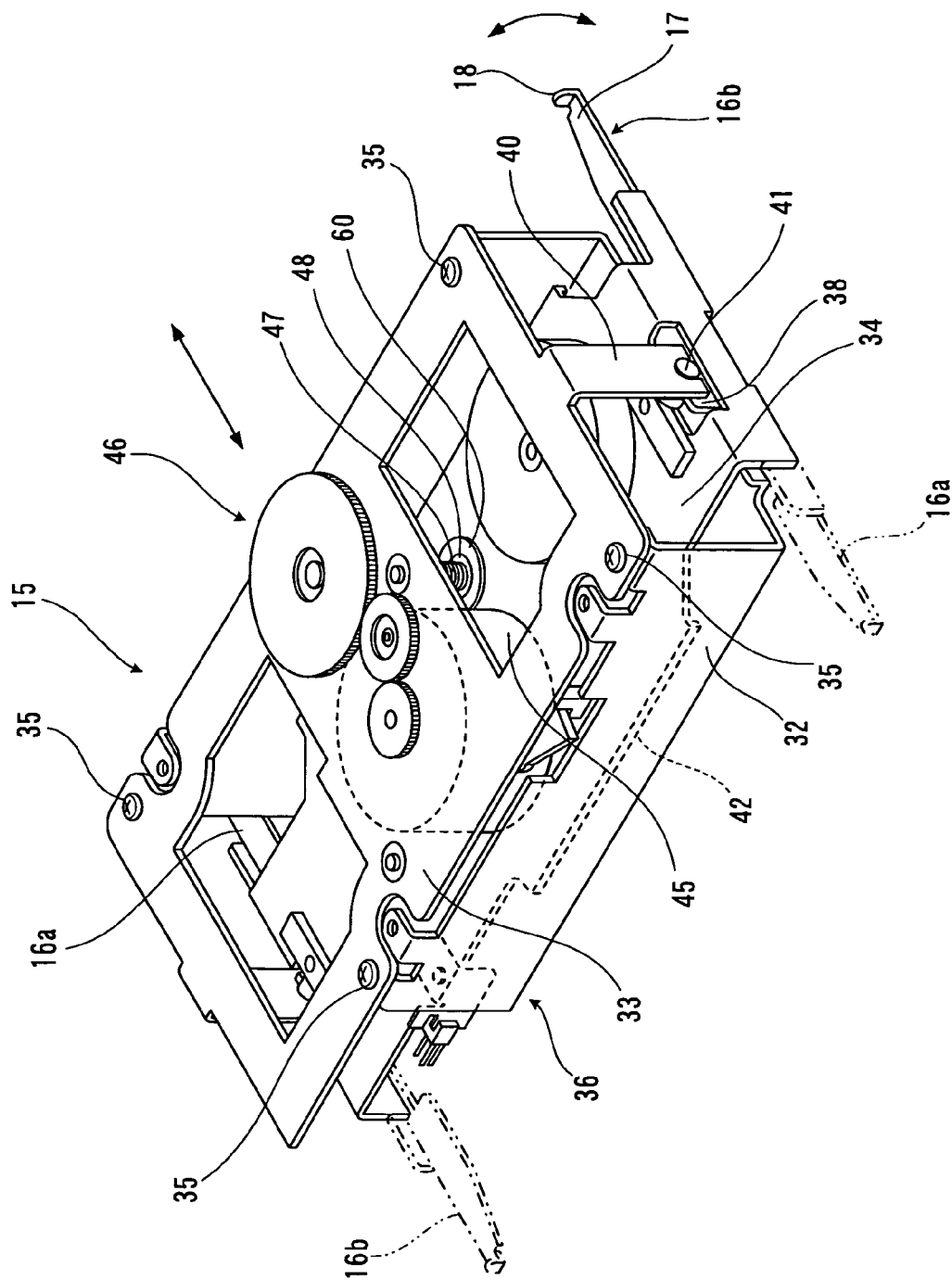
FIG. 2 is a general perspective view of the part shown in FIG. 1.
Figure 3:
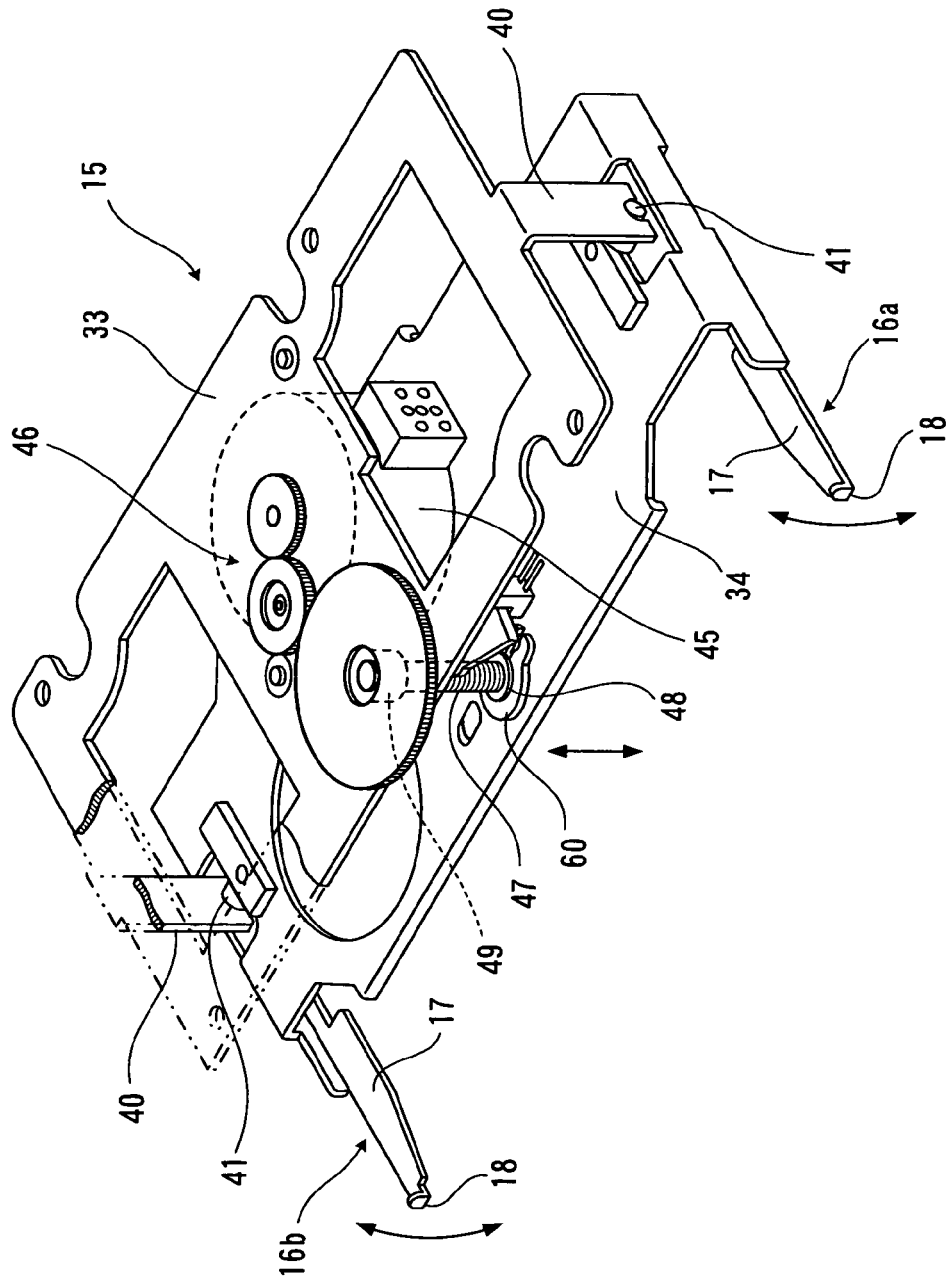
FIG. 3 is a perspective view of the part shown in FIG. 2 from another direction, with a, lower side stationary frame being omitted.
Figure 4:
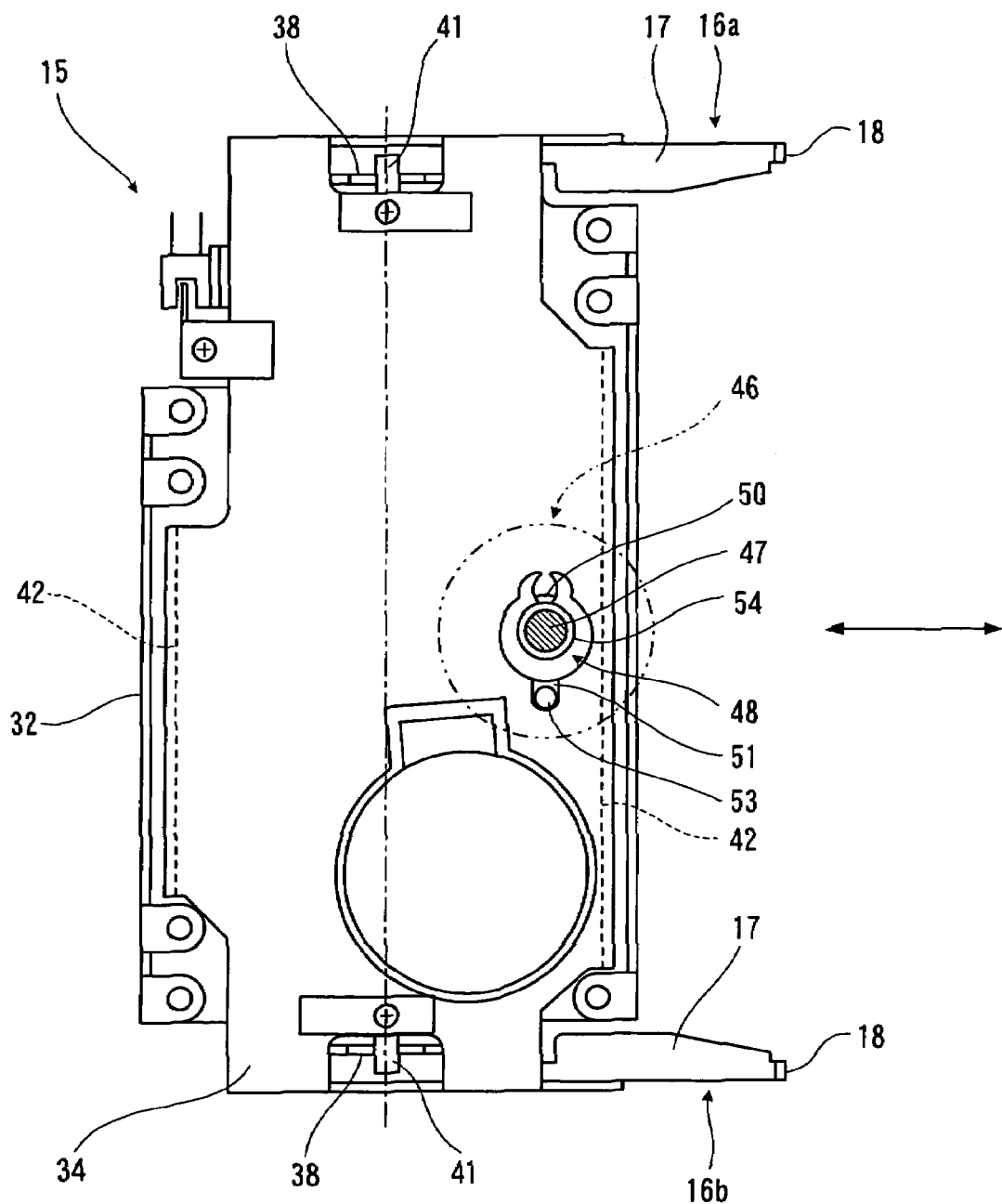
FIG. 4 is a plane view of the part shown in FIG. 2.

When the tape cassette 1 is drawn out of the garages 8a or 8b in, for example, FIG. 5 and is transferred into the tape drive 6 in such a construction, the movable body 15 is brought close to the tape cassette 1 in the state in which the swing arms 16a and 16b are lowered by swinging the swing frame 34 downward. When the movable body 15 is close to the tape cassette 1, the nut-shaped body 48 is raised by the rotation of the screw shaft 47, and thereby, the swing frame 34 to which the nut-shaped body 48 is loosely mounted is swung upward, whereby the swing arms 16a and 16b are raised, and their raised parts 18 are fitted into the recessed parts 10a and 10b of the tape cassette 1. FIG. 1 shows the state at this time, and the tape cassette 1 is chucked by the swing arms 16a and 16b.

When the movable body 15 is moved in the direction to be away from the garages 8a and 8b next, the tape cassette 1 is drawn out of the garages 8a and 8b and is housed in the picker 9. There, the tape cassette 1 is carried by the picker 9 and is transferred into the tape drive 6.

The apparatus functions in the same manner when the tape cassettes 1 are pushed into the garages 8a and 8b, and it also functions in the same manner when the tape cassette 1 is pushed into the tape drive 6 and the tape cassette 1 is drawn out of the tape drive 6.

INDUSTRIAL APPLICABILITY

In the cassette library apparatus of the present invention, the drive mechanism of the swing arm can have the simple construction provided with the feed screw and the nut-shaped body which is mounted to the swing frame and swings the swing frame by the operation of the feed screw, in the picker for drawing out and pushing the cassette housed in the garage and having recessed parts at the bottom portion from the garage and into the garage, and therefore, the cassette library apparatus of the present invention is useful as a cassette library apparatus or the like in which a cassette such as a tape cassette housed in the garage is drawn out by the picker of the turn table structure and the cassette is transferred to the driver for performing recording and reproduction on a medium in this cassette.

The invention claimed is:

1. A cassette library apparatus comprising a picker for loading and unloading a cassette housed in a garage, said picker comprising:
   a frame;
   a swing frame rotationally mounted to the frame with a shaft, said swing frame rotatable about a horizontal axis that is perpendicular to a direction of motion of the picker;
   a swing arm extending from the swing frame perpendicular to the horizontal axis;
   an engaging part located at a tip end of the swing arm for engaging a recessed part of a cassette from below when the swing arm rotates up toward the cassette from a lower position;
   a feed screw rotatably attached to the frame; and
   a nut screwed onto the feed screw, the nut mounted to the swing frame for rotating the swing frame by the operation of the feed screw.

2. The cassette library apparatus according to claim 1, wherein the nut is mounted to the swing frame such that there is play with respect to the swing frame.

3. The cassette library apparatus according to claim 2, wherein the nut is mounted to the swing frame such that there is play in a swing direction of the swing frame and in a direction of a plane perpendicular to the swing direction of the swing frame.

4. The cassette library apparatus according to claim 3, wherein the swing frame is formed into a plate-shaped body;
   a first through-hole and a second through-hole in a long hole shape are in the swing frame; and
   the nut has a first projection which is inserted into the first through-hole in a state in which the first projection has a play, and a second projection which is inserted into the second through-hole with a play in a lengthwise direction of the long hole shape.

5. The cassette library apparatus according to claim 2, further comprising a rotation stopper for stopping the rotation of the nut.

* * * * *